March 4, 1969 W. H. VOGELSBERG 3,430,915
NON-CUMULATIVE FORCE ELECTRIC MOTOR
OR GENERATOR BRUSH SPRING
Filed May 16, 1966 Sheet 1 of 3
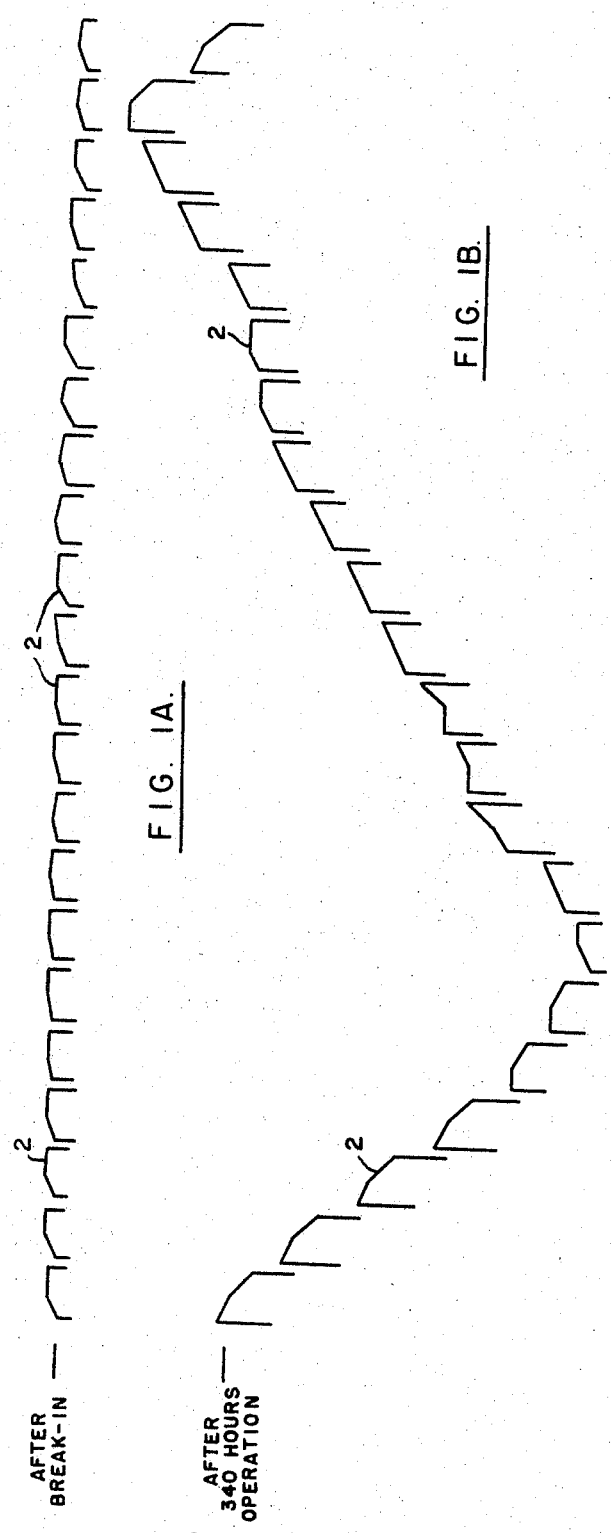
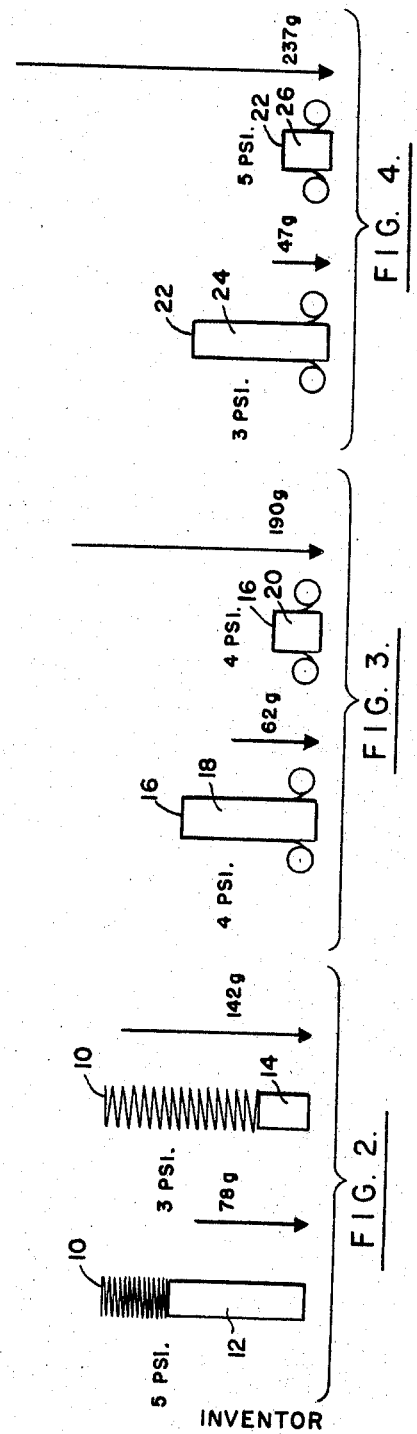
INVENTOR
WALTER H. VOGELSBERG
BY
ATTORNEYS March 4, 1969

W. H. VOGELSBERG 3,430,915

NON-CUMULATIVE FORCE ELECTRIC MOTOR
OR GENERATOR BRUSH SPRING

Filed May 16, 1966

INVENTOR

WALTER H. VOGELSBERG

BY

ATTORNEYS

March 4, 1969

W. H. VOGELSBERG 3,430,915

NON-CUMULATIVE FORCE ELECTRIC MOTOR
OR GENERATOR BRUSH SPRING

Filed May 16, 1966

INVENTOR
WALTER H. VOGELSBERG

BY

ATTORNEYS

United States Patent Office
3,430,915
Patented Mar. 4, 1969

3,430,915
NON-CUMULATIVE FORCE ELECTRIC MOTOR OR GENERATOR BRUSH SPRING
Walter H. Vogelsberg, Radnor, Pa., assignor to Ametek, Inc., New York, N.Y., a corporation of Delaware
Filed May 16, 1966, Ser. No. 550,277
U.S. Cl. 267—1                    5 Claims
Int. Cl. F16f; H02k 13/00; H01r 39/40

ABSTRACT OF THE DISCLOSURE

A non-cumulative force brush spring has a ribbon of spring material formed into at least one tightly wound non-cumulative force spring coil. The spring has a negative gradient to provide for the exertion of an increasing force on the brush as the brush wears.

---

This invention relates to improved non-cumulative force springs for use with an electric motor or generator brush.

Non-cumulative force spiral springs are well known to the art being disclosed in, for example, Lermont Patent No. 2,609,192. Such springs are widely used commercially, being sold by the Hunter Spring Division of Ametek, Inc. under its trademark Neg 'Ator. Single coil non-cumulative force springs are widely used for electric motors and generators and for both commutators and slip rings. These single coil springs are often designated as of the mono-coil type. Non-cumulative force springs which employ two separate coils connected by a saddle and made from a continuous strip of material are designated as being of the saddle type and have also been used in the same manner.

Non-cumulative constant force brush springs represent a substantial improvement over other forms of brush springs with respect to the essential factor of increasing the life of the brush and where used with a commutator for providing better commutation due to exerting a constant force.

There is provided in accordance with this invention a non-cumulative force brush spring which exerts an increasing force as the brush wears and thereby provides a marked improvement in the results achieved by the heretofore used non-cumulative constant force brush springs.

The brush springs of the invention differ from heretofore known non-cumulative constant force springs in that they exert an increasing force on the brush as the brush wears. Thus, for example, the non-cumulative force brush spring of the invention may be formed so that the total available width of spring ribbon gradually increases as the spring rolls up on the previously coiled portions of the spring. This provides for the exertion of an increasing force as the brush wears down and the spring rolls up since it provides an increasing effective width of spring ribbon in the area adjacent each spring coil where the spring force is exerted. Advantageously, the spring will provide at least a 20% increase in force during the effective life of the brush. The available width of the spring ribbon can be varied in a number of ways. For example, the outer edges of the spring may be tapered. Alternatively, a tapered slot may be cut in the ribbon.

Non-cumulative constant force saddle springs have heretofore been made by first forming a single coil non-cumulative force spring from a ribbon of spring metal such as steel of uniform width by, for example, the method disclosed in Lermont Patent No. 3,007,239 which issued Nov. 7, 1961. The free outer end of the thus formed spring is then coiled until two equal coils are formed. The coils are then separated sufficiently to permit the formation of a flat central saddle portion employing a punch and die. This method may be employed to make the spring of the invention with the addition of a simple initial blanking step on the ribbon of spring stock to dimension the stock so as to provide the desired variations in the effective widths.

The invention and its objects will be further clarified by a reading of the following description in conjunction with the drawings in which:

FIGURE 1A is a diagrammatic development of a new commutator;

FIGURE 1B is a diagrammatic development of the commutator of FIGURE 1A after 340 hours of operation;

FIGURE 2 is a diagrammatic view illustrating forces and accelerations resulting from a coil spring with a new commutator brush and a worn commutator brush;

FIGURE 3 is a diagrammatic view of force and accelerations resulting from a constant force saddle spring with respect to a new brush and a worn brush;

FIGURE 4 is a diagrammatic view of forces and accelerations resulting from a spring in accordance with the invention with respect to a new brush and a worn brush;

Figure 5:
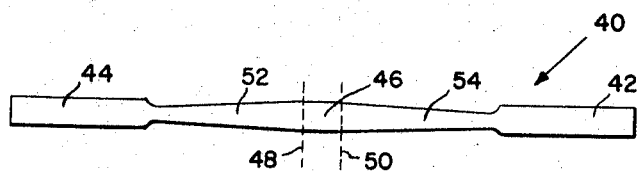
FIGURE 5 is a plan view of a spring ribbon from which a spring of the invention can be made.

Referring first to FIGURE 1A, the commutator bars 2 of a small high speed motor are shown greatly enlarged, FIGURE 1A representing the profile of a 22 segment commutator, having a diameter of 1.1050″, in its new condition. This commutator is intended to operate at 18,000 r.p.m., which is the equivalent of over 1,000″ per second surface speed. The maximum difference in height of the segments is .00016″, which is typical of good manufacture.

FIGURE 1B illustrates the profile of the same commutator bars 2 after 340 hours of normal operation. The copper bars 2 have eroded as a result of electrical and mechanical wear, and the commutator is not only smaller in diameter, but the profile has developed substantial hills and valleys. The radial variation in dimension is now .00380″, which is more than 20 times the original irregularity. The individual bar-to-bar steps are also more severe.

Only a small inward radial acceleration is required to enable the brush to follow the profile of FIGURE 1A. However, it is evident that to follow the irregular shape of FIGURE 1B a marked increase in brush acceleration would be required.

Another way of stating this is to assume that the adjacent commutator bars 2 of FIGURE 1B are in effect receding from the brush face at a high velocity. It is obvious that to maintain electrical contact the brush must be accelerated rapidly enough to follow the "falling-away" commutator surface. Loss of contact results from insufficient brush acceleration with the result that the electric current, which is maintained by the inductances of the circuit, jumps the intervening space in the form of an arc. These arcs result in erosion of both the brush material and the copper commutator bar. Not only does this result in a substantial increase in the rate of wear but, as has been found by investigation, the commutator usually gets progressively more irregular in shape, further aggravating the erosion condition.

In particular, many high performance fractional HP motors for appliances, etc., have a life which is almost entirely dependent on the life of the brushes and/or commutator. When either or both of these elements fail, the motor is either completely replaced or the appliance itself is discarded being inoperative.

Referring now to FIGURE 2, there is shown a compression coil brush spring 10 cooperating with a new brush 12 and a worn brush 14. Typically the forces and resulting accelerations towards the commutator are related as shown in the following table:

|  | New brush | Worn brush |
| --- | --- | --- |
| Brush length (in.) | 1.125 | .375 |
| Brush cross section (sq. in.) | .109 | .109 |
| Brush weight (lb.) | .0070 | .0023 |
| Spring force (lb.) | .545 | .327 |
| Brush pressure (p.s.i.) | 5 | 3 |
| Brush acceleration (g.) | 78 | 142 |

The acceleration of the brush thus increases as the brush wears but not sufficiently to adequately maintain brush 14 in contact with the irregular commutator bars shown in FIGURE 1B. This, of course, results in poor commutation. Further, the failure of the brush 14 to make good contact with each commutator bar results in heavy arcing which causes increased brush and commutator wear.

The situation is improved by employing the non-cumulative constant force saddle back spring 16 shown in FIGURE 3. In this case spring 16 is employed with a new brush 18 and a worn brush 20 resulting in the following forces and accelerations:

|  | New brush | Worn brush |
| --- | --- | --- |
| Brush length (in.) | 1.125 | .375 |
| Brush cross section (sq. in.) | .109 | .109 |
| Brush weight (lb.) | .0070 | .0023 |
| Spring force (lb.) | .436 | .436 |
| Brush pressure (p.s.i.) | 4 | 4 |
| Brush acceleration (g') | 62 | 190 |

Here as, contrasted to spring 10, better results are achieved with a worn brush while using a smaller initial force which reduces initial brush wear.

However, it has been found that markedly improved results can be achieved with a spring which exerts an increasing force as the brush wears. Such a spring is illustrated in FIGURE 4 where a saddle back spring 22 in accordance with the invention exerts a force of .327 lb. on a new brush 24 and a force of .545 lb. on a worn brush 26, resulting in the following forces and accelerations:

|  | New brush | Worn brush |
| --- | --- | --- |
| Brush length (in.) | 1.125 | .375 |
| Brush cross section (sq. in.) | .109 | .109 |
| Brush weight (lb.) | .0070 | .0023 |
| Spring force (lb.) | .327 | .545 |
| Brush pressure (p.s.i.) | 3 | 5 |
| Brush acceleration (g.) | 47 | 237 |

In this instance, the optimum conditions for a new brush and a worn brush can be achieved. A desirable smaller initial force of .327 lb. reduces initial commutator and brush wear while still providing an acceleration of 47 g which is adequate for good commutation on a new commutator. As the commutator wears, the force exerted by the spring increases. This augments the additional acceleration created by the reduced mass of the brush, so that with a worn brush the acceleration is 237 g.

The result is a markedly longer life for the brushes and for the motor with greater efficiency in operation. As pointed out above, this result is particularly valuable in the small fractional horsepower motors of today which are made for use only for the life of the brushes or commutators since it greatly extends the life of the entire motor.

Referring now to FIGURE 5, a ribbon 40 of spring steel has a pair of end portions 42 and 44 and a central saddle portion 46 which lies between the construction lines shown at 48 and 50. End portion 44 is connected to central portion 46 by a tapered portion 52 which tapers outwardly from the end portion 44 toward portion 46. Similarly, end portion 42 is connected to central portion 46 by a tapered portion 54 which tapers outwardly from the end portion 42 towards the central portion 46.

Figure 6:
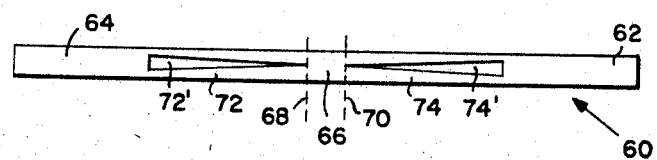
FIGURE 6 is a plan view of a spring ribbon from which a spring of the invention can be made.

Referring now to FIGURE 6, a ribbon of spring steel 60 has end portions 62 and 64 and a central saddle portion 66 lying between construction lines indicated at 68 and 70. A portion 72 has a tapered slot 72' connecting portions 64 and 66 and a portion 74 has a tapered slot 74' connecting portions 62 and 66. It will be noted that the total available width of metal in ribbon 60 is exactly the same as the total effective width of metal in ribbon 40 at any particular point along their respective lengths.

Figure 7:
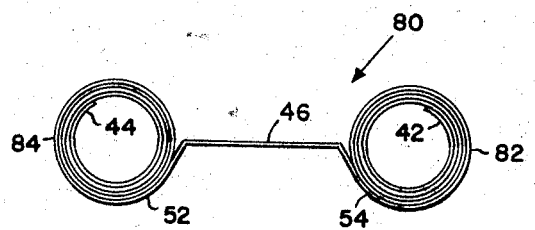
FIGURE 7 is a front elevation of a spring of the invention formed from the spring ribbon of FIGURE 5.

Ribbons 40 and 60 are readily made into non-cumulative saddle springs by the heretofore described process for making non-cumulative constant force saddle springs. Briefly, the spring ribbon is set to form a single coil non-cumulative force spring and the outer end is coiled until two equal coils are formed. The coils are then separated to permit the employment of a punch and die to straighten the central saddle portion. A spring 80 thus formed from ribbon 40 is shown in FIGURE 7. Spring 80 has a pair of tightly wound non-cumulative force spring coils 82 and 84 joined by a central saddle portion 46. A front elevation of a saddle spring formed from ribbon 60 would be identical with the showing of spring 80 in FIGURE 7.

Figure 8:
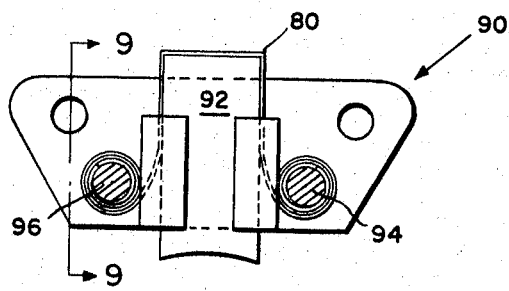
FIGURE 8 is a front elevation of the spring of FIGURE 7 in use in a motor brush spring holder.
Figure 9:
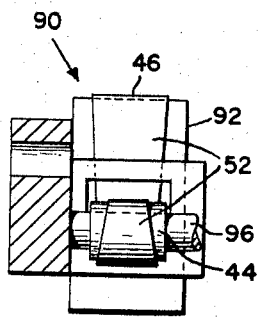
FIGURE 9 is a vertical section taken on the plane indicated by the lines 9—9 in FIGURE 8.

In FIGURE 8, spring 80 is shown assembled in a carbon brush holder 90 bearing against a carbon brush 92. Coils 82 and 84 are supported for free rotation on pins 94 and 96 respectively.

The only portion of the spring exerting a force is that portion adjacent coils 82 and 84. It will thus be evident that, as brush 92 wears permitting coil 82 and 84 to wind up, the force being exerted due to the increasing effective width of the ribbons adjacent coils 82 and 84 will gradually increase.

Figure 10:
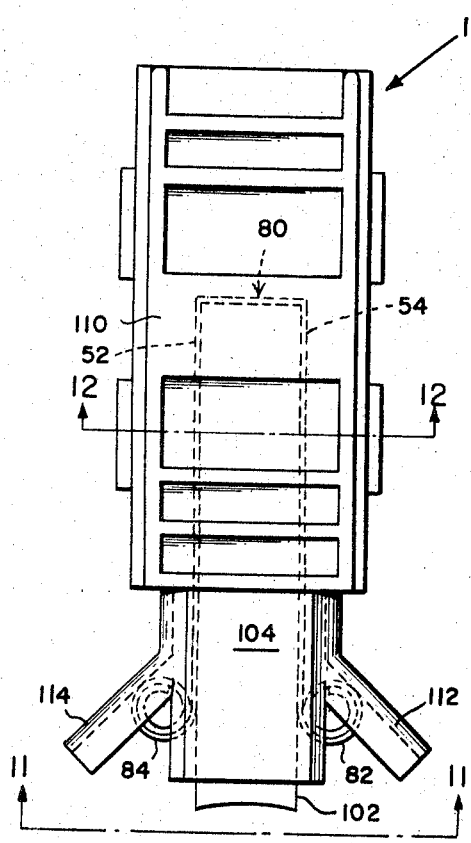
FIGURE 10 is a front elevation of a motor brush spring holder employing the spring of the invention.
Figure 12:
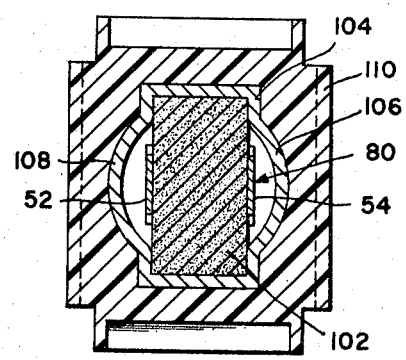
FIGURE 12 is a horizontal section taken on the plane indicated by the line 12—12 in FIGURE 10.
Figure 11:
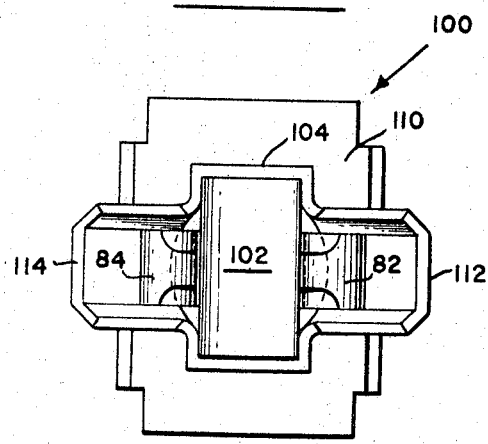
FIGURE 11 is a bottom plan view of the structure of FIGURE 10.

Referring to FIGURES 10 through 12, a spring 80 is incorporated in an alternative carbon brush holder 100 and urges downwardly a carbon brush 102 slidably mounted in a metal sleeve 104. Sleeve 104 has outwardly bowed portions 106 and 108 to accommodate spring 80 and is secured by a pressed fit in the body of portion 110 of brush holder 100. Coils 82 and 84 of spring 80 bear freely against tapered wing portions 112 and 114 respectively of sleeve 104. Here again, it will be evident that as the brush 102 wears down and as more of spring 80 is coiled onto coils 82 and 84, the force exerted by spring 80 on brush 102 will increase due to the increasing effective width of the spring adjacent coils 82 and 84. With a new brush 102 as illustrated in FIGURE 10, the lower portions of the tapered portions 52 and 54 of spring 80 will be lying adjacent coils 82 and 84 and will be wound onto these coils as the brush 102 commences to wear.

Figure 13:
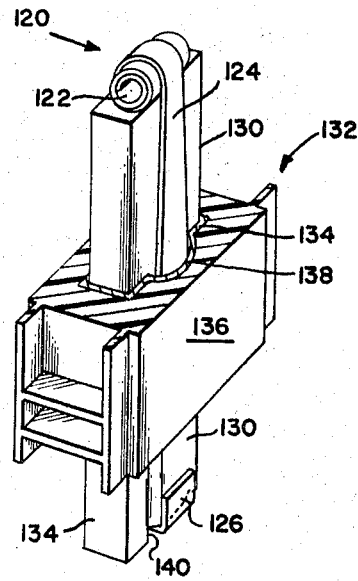
FIGURE 13 is a front perspective view of an alternative embodiment of the invention, partially broken away.

Referring to FIGURE 13, a non-cumulative force, tightly coiled, mono-coil spring 120 is set to a substantially uniform radius. Spring 120 has a uniformly wide coiled inner portion 122 and is tapered throughout the major portion of its length as indicated at 124 to provide a negative gradient in the full range of its action on a brush. Spring 120 has a uniformly wide end portion 126 which is formed into the shape of a hook.

The inner portion 122 engages the end of a carbon brush 130 mounted in a brush holder 132 having a metal sleeve 134 pressed into a body portion 136 of insulating material. Sleeve 134 has a bowed out portion 138 to accommodate spring 120. Spring end portion 126 engages a notch 140 in sleeve 134.

Here, as in the case of the previously described embodiments, it will be clear that as the brush 130 wears the force exerted on the brush will increase due to the increasing effective width of the portion of spring 120 adjacent the coil.

It will be understood that the above described embodiments are merely illustrations and are not intended to be limiting.

What is claimed is:

1. A non-cumulative force brush spring comprising: a ribbon of spring material formed into two tightly wound non-cumulative force spring coils each having a negative gradient and joined by a saddle portion for engaging a brush to exert an increasing force on the brush as the brush wears.

2. The combination of claim 1 in which the ribbon of spring material has a decreasing effective width as it is uncoiled.

3. The combination of claim 2 in which the ribbon of spring material has at least one tapered slot.

4. The combination of claim 2 in which at least a portion of the ribbon of spring material is tapered.

5. The combination of claim 4 in which the inner ends of the coils are wider than the adjacent tapered portions of the ribbon of spring material.

References Cited

UNITED STATES PATENTS

| | | | |
|---|---|---|---|
| 2,695,968 | 11/1954 | Welch et al. | 310—246 |
| 2,930,390 | 3/1960 | Whitehead | 267—1 |
| 3,194,343 | 7/1963 | Sindlinger | 267—1 |
| 3,259,142 | 7/1966 | Richards | 267—1 |
| 3,132,273 | 5/1964 | Pernetta | 310—246 |

FOREIGN PATENTS 658,776    3/1938    Germany.

ARTHUR L. LA POINT, *Primary Examiner.*

U.S. Cl. X.R.

310—245